United States Patent
Dragan et al.

(10) Patent No.: US 9,584,466 B2
(45) Date of Patent: Feb. 28, 2017

(54) METHOD OF ESTABLISHING AN IP CONNECTION IN A MOBILE NETWORK AND VARIOUS CORRESPONDING EQUIPMENT ITEMS

(71) Applicant: OBERTHUR TECHNOLOGIES, Colombes (FR)

(72) Inventors: Vujcic Dragan, Colombes (FR); Fabien Cordier, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 397 days.

(21) Appl. No.: 14/087,160

(22) Filed: Nov. 22, 2013

(65) Prior Publication Data

US 2014/0146747 A1    May 29, 2014

(30) Foreign Application Priority Data

Nov. 23, 2012 (FR) ..................... 12 61200

(51) Int. Cl.
*H04L 29/12* (2006.01)
*H04W 12/00* (2009.01)

(52) U.S. Cl.
CPC ......... *H04L 61/106* (2013.01); *H04L 61/1511* (2013.01); *H04L 61/3075* (2013.01); *H04W 12/00* (2013.01)

(58) Field of Classification Search
CPC ........ H04W 72/00; H04W 12/00; H04L 61/00
See application file for complete search history.

(56) References Cited

U.S. PATENT DOCUMENTS

2004/0202107 A1 * 10/2004 Bensimon ............. H04W 28/10
                                                            370/229
2010/0054222 A1    3/2010 Rune
(Continued)

FOREIGN PATENT DOCUMENTS

EP        2 293 525 A1    3/2011

OTHER PUBLICATIONS

Telefon AB LM Ericsson et. al, "MTC Device Activation Procedure", 3GPP TSG GERAN #45bis, South Korea, May 17-21, 2010, GP-100885.*

(Continued)

*Primary Examiner* — Andrew Lai
*Assistant Examiner* — Sumitra Ganguly
(74) *Attorney, Agent, or Firm* — Young & Thompson

(57) ABSTRACT

The disclosure relates to the field of wireless communications, and more particularly a method of establishing an IP connection through a 3GPP mobile network, at least partially of IP type, a network equipment item, MME or PDN-GW, of that mobile network, a mobile network infrastructure, a mobile terminal and a corresponding system. The method includes the following steps, on a first equipment item, MME or PDN-GW, of the mobile network other than a mobile equipment item UE of the mobile network: receiving a fully qualified domain name, FQDN, sent by a mobile equipment item, UE, of the mobile network, the FQDN identifying a target data server; and on reception of the FQDN, triggering the resolution of the FQDN into an IP address of the target data server. Thus, a mobile user equipment item provided with a UICC card may be produced at low cost without incorporating DNS resolution mechanisms.

20 Claims, 4 Drawing Sheets

(56) References Cited

U.S. PATENT DOCUMENTS

| | | | | |
|---|---|---|---|---|
| 2011/0142015 | A1* | 6/2011 | Shaikh | H04L 29/12641 370/338 |
| 2012/0147834 | A1* | 6/2012 | Zisimopoulos | H04L 29/12066 370/329 |
| 2012/0158940 | A1* | 6/2012 | Nishi | H04L 29/12066 709/223 |
| 2012/0203909 | A1* | 8/2012 | Kavanaugh | H04L 61/2517 709/226 |
| 2012/0287854 | A1* | 11/2012 | Xie | H04W 48/08 370/328 |

OTHER PUBLICATIONS

ETSI TS 102 223 v10.1.0 (Jan. 2011), Smart Cards; Card Application Toolkit (CAT) (Release 10).*

Telefon AB LM Ericsson et. al. "MTC Device Activation Procedure", 3GPP TSG GERAN #45bis, South Korea, May 17-21, 2010, GP-100885.*

Telefon AB LM Ericsson et al.: "MTC Device Activation Procedure", 3GPP Draft; GP-100885—MTC Device Activation Procedure, 3rd Generation Partnership Project (3GPP), Mobile Competence Centre ; 650, Route Des Lucioles ; F-06921 Sophia-Antipolis Cedex ; France, vol. TSG GERAN, No. Jeju; May 17, 2010, May 12, 2010 (May 12, 2010), XP050417121, [extrait le May 12, 2010] * sections I, 3 25 figure 1.

"3rd Generation Partnership Project; Technical Specification Group Core Network and Terminals; Numbering, addressing and identification (Release 11)", 3GPP Standard; 3GPP TS 23.003, 3rd Generation Partnership Project (3GPP), Mobile Competence Centre; 650, Route Des Lucioles ; F-06921 Sophia-Antipolis Cedex ; France, vol. CT WG4, No. V11.3.0, Sep. 25, 2012 (Sep. 25, 2012), pp. 1-83, XP050650151, [extrait le Sep. 25, 2012] sections 9.1, 9.1.1, 19.4.2.2.1.

International Search Report, dated Jun. 14, 2013, from corresponding PCT application.

* cited by examiner

METHOD OF ESTABLISHING AN IP CONNECTION IN A MOBILE NETWORK AND VARIOUS CORRESPONDING EQUIPMENT ITEMS

This application claims priority from French application FR 1261200 filed on Nov. 23, 2012, which application is incorporated herein by reference.

FIELD OF THE INVENTION

The present invention concerns the field of wireless communications, and more particularly a method of establishing an IP connection through a mobile network, for example of 3GPP type and at least partially of IP type, a network equipment item of that mobile network, a mobile network infrastructure, a mobile terminal and a corresponding system.

Context of the Invention

Mobile telephone networks, and in particular those of 3GPP type, have evolved substantially with the progressive integration of sub-parts using packet data protocol to support packet data services, for example IP (Internet Protocol) services. 2G and 3G networks, in particular GPRS (General Packet Radio Service) and UTMS (Universal Mobile Telecommunications System), are based on a switched GSM mobile network (GSM standing for Global System for Mobile Communications) attached onto a GPRS network core, that is to say IP. One of the latest versions of 3GPP, LTE, for Long Term Evolution, or EPS, for Evolved Packet System, is a mobile network entirely based on IP.

In order to enable a secure module, such as a chip card or UICC (Universal Integrated Circuit Card), or a user mobile terminal, UE, to establish an IP connection with a service hosted on an OTA target server (OTA for Over-The-Air), the secure module or terminal must in general know the IP address of the target server. An IP connection is the support for packet data services.

In highly secure applications in which the user must not have access to the parameters defining the target server, it is preferable if the UICC has to know that IP address the case arising.

However, an IP address is generally intended to be attributed dynamically and to change over time. Furthermore, the target service may be hosted on several servers, which may be moved, rendered temporarily inaccessible, etc.

Therefore, the UICC or terminal must be able to have recourse to a Fully Qualified Domain Name (FQDN) in order to designate that target service, independently of the server equipment item that will be capable of responding to its request at a given time.

The conversion of the FQDN into an IP address is known for conventional IP networks, such as the Internet, under the name DNS resolution (DNS standing for Domain Name System).

The current standards for 3GPP mobile networks provide for the IP address of the OTA target server to be known to the UICC in advance and to be fixed, thereby avoiding a DNS resolution. No means is thus provided for the UICC to enable a DNS resolution for an FQDN.

To mitigate this lack, document EP 2 293 525 provides for such an UICC to be able to call upon a conventional DNS client of the mobile terminal integrating it in order to obtain a fixed IP address with which it may communicate.

This configuration however presents certain drawbacks.

DNS resolution relies on the external IP network which the mobile terminal accesses via the 3GPP mobile network. Parameters within the terminal define that external network. Most often, this is the Internet public network. DNS resolution over several distinct public and/or private IP networks is not possible without re-parameterizing the terminal. This re-parameterization is furthermore not compatible with secure utilizations in which the parameters are stored in the UICC.

Moreover, developments specific to the mobile terminal and to the UICC are necessary in EP 2 293 525 in order to enable recourse to the DNS client. However, these developments are poorly adapted to certain technical contexts, in particular that of Machine-Type Communications ("MTC") or Machine-to-Machine ("M2M") communications which concern applications of low complexity and low cost. For example this concerns equipment for remote control and measurement, for example a gas meter, an electricity meter, an item of measuring equipment of a weather station, etc.

In this context, it would appear opportune to develop DNS resolution solutions reducing the costs of development and production for mobile terminals, for example to enable a UICC in a mobile terminal or mobile equipment item, ME, to use and manage domain names when establishing an IP connection in a 3GPP mobile network.

SUMMARY OF THE INVENTION

The present invention is directed to mitigating all or some of these drawbacks, by providing in particular a DNS management and resolution mechanism that is independent from the mobile terminal and from the UICC secure module.

To that end, a first aspect of the invention concerns a method of establishing an IP connection through a mobile network comprising the following steps, on a first equipment item of the mobile network other than a mobile equipment item UE of the mobile network.

receiving a fully qualified domain name, FQDN, sent by a mobile equipment item, UE, of said mobile network, the FQDN identifying a target data server; and on reception of the FQDN, triggering the resolution of the FQDN into an IP address of the target data server.

According to the invention, the DNS management/resolution, including the triggering of the DNS resolution, is moved to an equipment item of the mobile network infrastructure (that is to say other than a mobile terminal using that network), making the DNS mechanisms independent from the mobile terminal and from a secure UICC module that it may possibly host. By basing the mobile network on these mechanisms, a client application in the UICC or the mobile terminal may thus initiate an IP connection with a remote server application using an FQDN without having internally available DNS resolution means.

Terminals and UICCs of low technical complexity may thus be used, that are highly adapted to M2M uses. In particular, a hypothetical modification of the UICC to integrate therein costly DNS resolution mechanisms is thereby dispensed with.

This is rendered possible by the configuration of the equipment item of the mobile network whereby the reception of an FQDN triggers the DNS resolution. To be precise, current mechanisms for mobile networks, in particular 3GPP, solely provide for the reception of fixed IP addresses by mobile terminals, in particular coming from a UICC.

No parameterization relative to a DNS resolution is therefore necessary within the mobile terminal or the UICC. Furthermore, the DNS resolution provided by the invention on the mobile network makes it possible to process DNS resolutions relative to several IP networks simultaneously.

By virtue of the IP obtained by the DNS resolution, an IP connection may ultimately be established with the mobile terminal or the UICC, as the case may be.

In a complementary manner, a second aspect of the invention is directed to an equipment item of that 3GPP mobile network infrastructure providing the same advantages. Thus, an equipment item of a mobile network, according to the invention, comprises means configured for:

receiving a fully qualified domain name, FQDN, sent by a mobile equipment item UE of the mobile network, the FQDN identifying a target data server; and on reception of the FQDN, triggering the resolution of the FQDN into an IP address of the target data server.

Other features of the method and of the network equipment item according to embodiments are described in the dependent claims.

In one embodiment, the method further comprises the following steps:

obtaining an access point name, APN, identifying an external packet data network, PDN, for the mobile equipment item UE; and selecting, by another equipment item of the mobile network other than the mobile equipment item UE, at least one gateway of the mobile network to the external PDN network, by a procedure of discovery and selection from the obtained APN;

in which method the first equipment item is said selected gateway.

This corresponds to a mobile network infrastructure, comprising an item of equipment configured for:

obtaining an access point name, APN, identifying an external packet data network, PDN, for a mobile equipment item UE of the mobile network; and selecting at least one gateway of the 3GPP mobile network to the external PDN network, by a procedure of discovery and selection from the obtained APN, said gateway being an equipment item as defined above receiving a fully qualified domain name, FQDN, sent by the same UE.

This provision makes explicit the possibility, for the mobile network infrastructure, of resolving DNS domain names that are external to that mobile network. This is because, in this case, the APN makes it possible to identify an appropriate gateway to the PDN network which the mobile terminal wishes to access. It is this gateway that is legitimate in undertaking a DNS resolution procedure, possibly through recourse to that PDN network.

In particular, the mobile network is a 3GPP mobile network at least partially of IP type, the first equipment item is a PDN-GW gateway of the 3GPP mobile network to the external PDN network, the other equipment item is a mobility management entity, MME, of the 3GPP mobile network and the target data server is a node that is external to the 3GPP mobile network belonging to the external PDN network. It for example comprises an EPS architecture (EPS standing for Evolved Packet System) constituting a "3,9G" mobile telephone network, entirely based on the IP protocol.

This configuration enables the implementation of a DNS resolution according to the invention in a 3,9G network, i.e. in an EPS system.

According to another particular feature, to resolve the FQDN into an IP address, the first equipment item forming a gateway to the external PDN network sends a DNS resolution request to an external DNS server belonging to the external PDN network. In other words, the first equipment item forming a gateway to the external PDN network is configured to resolve the FQDN into an IP address by sending a DNS resolution request to an external DNS server belonging to the external PDN network.

Thus, here, it is an equipment item of the 3GPP network infrastructure, and not the user terminal UE, that performs the DNS resolution on behalf of that terminal (or of the UICC it hosts). The DNS resolution request on the external PDN network may be conventional to any IP network.

A variant of this configuration may provide for the first equipment item to send a DNS resolution request to a DNS server that is internal to the 3GPP mobile network, that internal DNS server thus requesting an external DNS server belonging to the external PDN network for said DNS resolution. This variant is appropriate where, according to the parameterization of the 3GPP mobile network, the gateway (the first equipment item) is not authorized to connect to the PDN network or to have recourse to an external DNS server.

In an embodiment as a variant of the use of the APN, the mobile network is a 3GPP mobile network at least partially of IP type, the first equipment item is a mobility management entity, MME, of the 3GPP mobile network and the target data server is a node that is internal to the 3GPP mobile network.

This provision makes explicit the possibility, for the IP-based 3GPP mobile network infrastructure, of resolving DNS domain names that are internal to that 3GPP mobile network. This possibility is thus in addition to the possibilities for procedures of discovery and selection of SGWs (Serving GateWays) and PDN-GWs already provided in EPS systems. The MME equipment item, in that it already centralizes these procedures of discovery and selection, is legitimate for the management of this new possibility provided by the invention.

According to a particular feature, the triggering of the resolution of the FQDN takes place if the first MME equipment item has not already obtained an access point name, APN, identifying an external packet data network, PDN, for the mobile equipment item UE; and if an APN has already been obtained, the first MME equipment item sends the FQDN to a gateway, internal to the 3GPP mobile network, to the external PDN network. In a complementary manner, the MME equipment item considered is configured to perform these steps.

This provision makes it possible to efficiently distribute the DNS resolution between the MME and the gateway, generally a PDN-GW, for example according to whether the target server is internal to the 3GPP mobile network (no APN sent by the UE) or external to the 3GPP mobile network (APN sent by the UE to indicate the external PDN).

In an embodiment, the resolution of the FQDN into an IP address is carried out during a procedure for activation, in the mobile network, of a context of packet data protocol, PDP, between the mobile equipment item UE and a target node of the mobile network, generally the APN forming a point of access to an external packet data network. In a complementary manner, the equipment item considered is configured to resolve the FQDN into an IP address during an activation procedure, in the mobile network, of a context of packet data protocol, PDP, between the mobile equipment item UE and a target node of the mobile network.

The PDP context indicates a logical association between the UE and an external packet data network, of public network type, such as the Internet, or private, defining a communication channel in the IP infrastructure of the mobile network. This context defines aspects such as routing, the quality of service, and the security of communications. The procedure for activating a PDP context in an EPS system is known under the designation "Activation PDP Context request" in 3GPP networks of LTE type.

This embodiment enables the PDP context to be accepted only after DNS resolution, and thus after verification of whether the IP address associated with the FQDN does indeed exist and can be accessed. This configuration thus avoids wasting resources in the mobile network, which could occur if the target server was inaccessible.

In a variant more in conformity with the current standard, the resolution of the FQDN into an IP address is carried out subsequently to a procedure for activation, in the mobile network, of a context of packet data protocol, PDP, between the mobile equipment item UE and a target node of the mobile network, in response to the sending, by the mobile equipment item UE, of a data packet bearing the FQDN as recipient address. In a complementary manner, the equipment item considered is configured to perform the DNS resolution under these conditions.

Thus, the DNS resolution takes place after the mobile network has reserved an internal IP communication channel (PDP context) between the requesting mobile equipment item and a point of output for example to an external packet data network.

Under the invention, in which the DNS resolution according to the invention is moved into the actual infrastructure of the mobile network without action by the mobile terminal or by the UICC, these latter are caused to send data over the IP then established, using the FQDN.

In this context, according to one embodiment, the following steps are provided, in said first equipment item:

receiving, from the mobile equipment item UE, a data packet indicating the FQDN as recipient for said data packet, and substituting the FQDN by the resolved IP address within the data packet before resending the data packet to the resolved IP address.

In a complementary manner, the equipment item considered is configured to perform these steps.

Thus, whether the role of first equipment item is played by the MME or by the PDN-GW or by any other equipment item, the indication of the recipient IP address for the IP packets sent by the mobile terminal/by the UICC is carried out by that first equipment item, and not by the mobile terminal/UICC as is the case in conventional techniques.

This provision ensures proper sending of the IP packets sent by the mobile terminal/UICC to the target server indicated by the FQDN.

In another embodiment, the first equipment item sends the resolved IP address to the mobile equipment item UE. This enables that equipment item and/or the secure module, UICC, to directly use the resolved IP address according to the mechanisms already set up in the EPS systems or for the secure modules (see the standard ETSI TS 102 223 defining the exchanges between the UICC and the UE).

As referred to previously, certain contexts of use require a high level of security in establishing the IP connection and in the data exchanges ensuing therefrom. This is the case when recourse is made to a secure module, of the UICC type referred to in the standard ETSI TS 102 22. A client application of the UICC must therefore establish an IP connection with a remote server application.

In this embodiment, before sending the FQDN to the first equipment item, the mobile equipment item UE receives a request for activation of a context of packet data protocol, PDP, comprising the FQDN and sent by a secure module, the UICC for example, inserted into the mobile equipment item UE.

In particular, the secure module is a universal integrated circuit card, UICC, and the activation request is an OPEN CHANNEL request defined in accordance with the standard ETSI TS 102 223. The secure circuit or module is thus capable of requesting an IP session with the servers by using the Bearer Independent protocol of that standard ETSI TS 102 223 v11.

According to a particular feature, the OPEN CHANNEL request comprises at least one address data item and a byte of address type in said address data item which takes a particular value other than '21' and '57' when an address provided in a field of the address data is an FQDN.

This provision makes it possible to avoid introducing modifications to the ETSI TS 102 220 standard by using a particular new code for the type of address provided in the OPEN CHANNEL. As a matter of fact, until now, only type '21' and '57' respectively corresponding to IP address types v4 and v6 were used.

Another aspect of the invention is directed to a mobile equipment item, UE, of a mobile network, comprising a universal integrated circuit card, UICC;

the UICC being configured to send, to a processor of the mobile equipment item UE, an OPEN CHANNEL request defined according to the ETSI TS 102 223 standard, the OPEN CHANNEL request comprising at least one address data item and a byte of address type in said address data item which takes a particular value other than '21' and '57' when an address provided in a field of the address data is a fully qualified domain name, FQDN;

the UE being configured to send, over the mobile network, data packets including the FQDN as recipient address.

Indeed, in the context of the mechanisms referred to for DNS management in the network IP core, a mobile equipment item specific to the invention henceforth no longer needs to know, in particular in advance, the IP address of the target server to access and may thus send data only by making reference to an FQDN.

Another aspect of the invention is directed to a system comprising a mobile network infrastructure as defined above and a mobile equipment item, UE, as defined above, that is configured to send a fully qualified domain name, FQDN, over the mobile network.

BRIEF DESCRIPTION OF THE DRAWINGS

Still other particularities and advantages of the invention will appear in the following description, illustrated by the accompanying drawings, in which.

DETAILED DESCRIPTION OF THE INVENTION

The invention enables a client application of a UICC or of a user mobile terminal UE to establish an IP session or connection with a remote server application simply using an FQDN, instead of a fixed IP address defined in advance in the conventional techniques.

As described below, two main situations may arise: firstly, when the target server hosting the desired server application forms an integral part of the mobile network, and secondly, when the target server is external to the mobile network.

In the first case, in which the target server is thus a node that is internal to the network infrastructure of the mobile operator having the mobile network, the UE, and preferably the UICC, provides an address of FQDN type. The reception of such an address type triggers, within the mobile network, a DNS internal resolution to obtain an IP address corresponding to the FQDN received.

In the second case, in which the target server is thus a node that is external to the mobile network, the UE, and preferably the UICC, also provides an address of FQDN type. An access point name, APN, is obtained in the network (for example by default from a server or supplied by the UE). The APN provides information on the access point in the mobile network to an external IP network, PDN (for Packet Data Network), in which the target server is located.

In a conventional manner, obtaining the APN triggers, within the mobile network, a DNS type internal resolution to determine internal nodes enabling access to the external PDN network. This is for example a procedure of discovery and selection of gateways SGW and PDN-GW as defined in the 3GPP TS 29 303 standard for a 3GPP mobile network of EPS type.

Furthermore, the reception of the FQDN triggers, within the mobile network and in particular in the PDN-GW gateway in the case of an EPS type network, a DNS resolution to obtain an IP address corresponding to the FQDN received. As will be seen below, this DNS resolution may comprise the sending of external DNS requests to a DNS server of the external PDN network.

The IP address then obtained by resolution is used in establishing and conducting an IP session/connection with the target server. The equipment item of the mobile network that resolved the FQDN may in particular perform a procedure for establishing an IP connection with the target server, using the resolved IP address.

It can thus be seen that, according to the invention, the reception of an FQDN type address by the equipment item of the mobile infrastructure is operative to trigger a DNS resolution in the mobile network by that equipment item.

Figure 1:
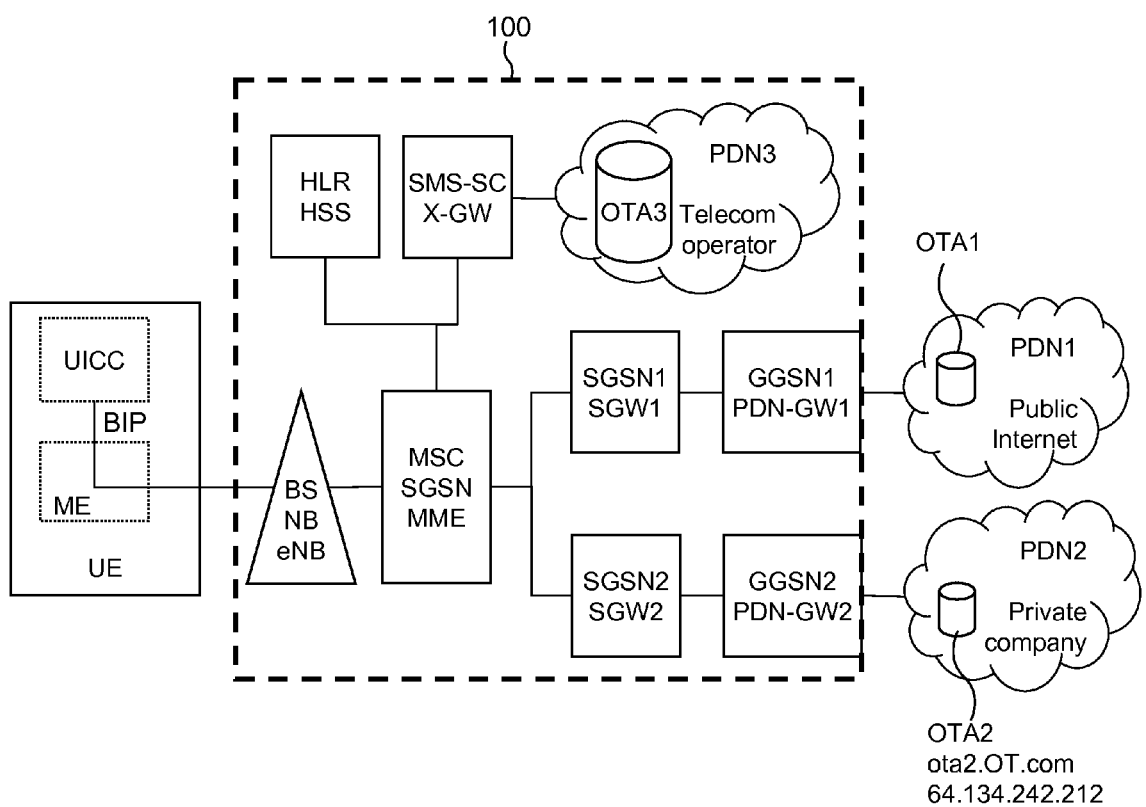
FIG. 1 diagrammatically illustrates a 3GPP mobile network to which a user mobile equipment item UE connects, and which is linked to two external packet data networks.

FIG. 1 diagrammatically illustrates a 3GPP mobile network 100 to which a user mobile equipment item UE connects, and which is linked to two external packet data networks, PDNs, referenced PDN1 and PDN2.

In the example of the Figure, the external network PDN1 is a public IP network, of Internet type; the external network PDN2 is a private IP network enabling access to servers and services of that private network.

The 3GPP mobile network 100 is at least partially of IP type. The 3GPP mobile network system of EPS is fully IP, whereas the 3GPP mobile network systems for 2G (e.g. GPRS) and 3G (e.g. UMTS) are partially IP, including only an IP core (GPRS core) in the midst of a switched network. Although the invention applies to any type of 3GPP mobile network at least partially of IP type, the explanations below make reference in the essential to EPS systems that are fully IP, that is to say to the recent LTE standard.

The application of the teachings of the invention as described below, to other types of 3GPP mobile network requires the transposition of the functions referred to in relation to EPS into similar functions in those other types of 3GPP mobile network.

For example, the extensions of the DNS resolution functions that are internal to the EPS network will also be provided for the DNS resolution functions that are internal to those other types of 3GPP mobile network.

The conducting of a DNS resolution by the MME or the PDN-GW of the EPS system will be provided in similar manner in the equipment items that perform identical roles within the other types of 3GPP mobile network, for example the SGSN (Serving GPRS Support Node) instead of and in place of the MME or the GGSN (Gateway GPRS Support Node) instead of and in place of the PDN-GW.

Returning to FIG. 1, the 3GPP mobile network 100 also includes an internal packet data sub-network, PDN3. This network PDN3 is specific to the telecom operator of the 3GPP mobile network 100 so as to provide particular services, for example of OTA management.

The 3GPP mobile network 100 comprises base stations, BS, or evolved Nodes B, denoted eNB, to which mobile user equipment items, UE, connect by radio link. The UEs are for example mobile telephones.

The 3GPP mobile network 100 also comprises one or more Mobility Management Entities, MME. Each MME plays a key role in the conventional management of the network 100.

Thus, it conducts the procedures for attaching a UE to the mobile network 100, in particular using procedures of authentication and authorization.

This attachment procedure is known by the designation "attach request/response".

Furthermore, it receives activation PDP context requests sent by the UEs, and conducts those activations. For this, it conducts the procedures for discovery and selection of gateways which are in accordance with the 3GPP parameters and/or are defined by the telecom operator.

Moreover, it may act as a DNS Resolver where the UE provides restrictive selection information in its activation request. In this case, the MME creates an FQDN on the basis of the restrictive selection information, for example a particular APN (a string containing a reference to a PDN or to an internal node which the user wishes to access) or a group of components in the network 100. The constitution of the FQDN follows rules specific to the 3GPP standard, which are for example described in the TS 29 303 specification.

The FQDN so obtained is used in the procedures for gateway discovery and selection.

The DNS Resolver function is only used by the MME on activation of a PDP context for example when a new UE accesses the network, or in case of geographical mobility (handover) or when a new PDP context is sought by the UE which wishes to have several simultaneous accesses to several PDN networks.

Certain embodiments of the invention make provision to extend these conventional functionalities. According to the invention, the MME is capable of receiving an FQDN sent by the UE and to process it as follows, where that FQDN corresponds to a node that is internal to the network 100, that is to say corresponds to OTA3 of the PDN3 shown in FIG. 1. This situation generally occurs when the UE sends no APN and an APN by default must be used.

The processing of the FQDN received by the MME is mainly the triggering of the DNS resolution of said FQDN into an IP address. This makes it possible to obtain the IP address of the internal target node, that is to say of OTA3. This DNS resolution may implement conventional DNS resolution mechanisms.

According to equivalent embodiments, these DNS resolution mechanisms are provided within the actual interior of the MME, or are added to DNS mechanisms that are internal to the mobile network 100 and distinct from the MME, in which case the MME makes requests to those internal DNS mechanisms.

Where appropriate, the MME can send back to the UE the IP address obtained.

Preferably, it is the MME that carries out the conversion of data packets received later from UE and bearing the FQDN as recipient address, into packets bearing the resolved IP address as recipient address.

In the opposite case (the FQDN does not correspond to a node internal to 100), the MME is configured to send that information, FQDN, to a gateway that has actually been selected by the appropriate procedures based on the APN sent by the UE. The MME then acts as a routing entity in the PDP context established between the UE and the selected gateway.

The 3GPP mobile network 100 also comprises a Home Subscriber Server, HSS, on which has been saved all the information relating to the subscribers of the network 100. Thus, it is in close collaboration with the HSS server that the MME conducts the attachment procedure and that of activating the PDP context for a given UE. More particularly, the HSS contains not only the user's authentication and authorization information (rights), but also certain parameters by default, such as an APN by default to use by the MME for the procedures of discovery and selection if the UE does not provide them. This APN by default may designate a sub-network internal to the 3GPP mobile network or a PDN network external thereto.

The 3GPP mobile network 100 also comprises an X-GW gateway to PDN3, SGW gateways provided to route the data packets to the PDN networks and PDN-GW gateways constituting the output gates from the 3GPP mobile network 100 to the external networks PDN1 and PDN2. A UE may have simultaneous connectivity with several PDN-GW gateways to access multiple external PDNs.

Certain embodiments of the invention provide for extending the conventional functionalities of the PDN-GW to the management of an FQDN sent by a UE and routed by the MME. This is a situation in which the FQDN sent corresponds to a node external to the network 100, in particular a node belonging to the external PDN network linked to the PDN-GW selected by the MME on the basis of an APN indicated by the UE.

The processing of the FQDN by that PDN-GW mainly consists in the triggering of the DNS resolution of said FQDN into an IP address. This makes it possible to obtain the IP address of the target node on the external PDN network, for example the OTA2 of the PDN2.

This DNS resolution may implement conventional DNS resolution mechanisms within the external network PDN2, that is to say that the PDN-GW has a DNS client capable of sending DNS requests to a DNS server of PDN2.

As a variant, if the PDN-GW is not authorized to send requests over PDN2, it calls upon another equipment item internal to the network 100, for example an internal DNS server, that is authorized to communicate on the PDN2 network. This other internal equipment item then, on behalf of the PDN-GW, performs the DNS resolution procedure through the DNS server of PDN2 before providing the resolved IP address.

As shown in the Figure, the user mobile equipment item UE comprises a mobile equipment item, ME (standing for Mobile Equipment), and a UICC in accordance with the ETSI TS 102 221 standard. The ME and the UICC communicate together according to the BIP protocol (BIP standing for Bearer Independent Protocol) defined by the ETSI TS 102 223 standard.

Figure 2:
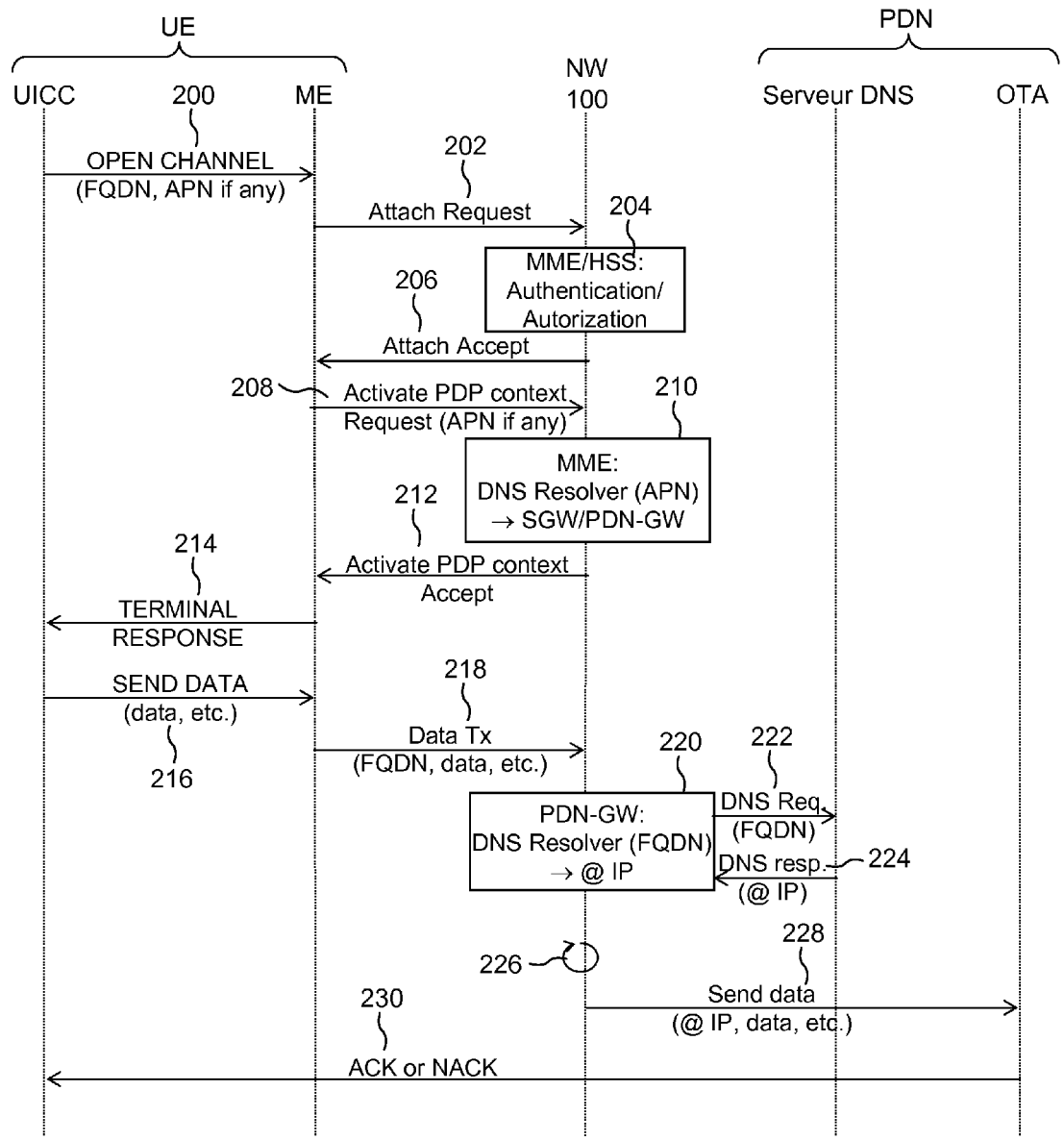
FIG. 2 illustrates exchanges of messages between various entities of FIG. 1 when establishing an IP connection between a UE and a target server OTA2 which is external to the mobile network subsequent to a procedure for activation of a PDP context.

With reference to FIG. 2 a description will now be given of a first embodiment of the invention. FIG. 2 illustrates exchanges of messages between various entities of FIG. 1 when establishing an IP connection between a UE and a target server OTA2 which is external to the 3GPP mobile network subsequent to a procedure for activation of a PDP context.

The process of FIG. 2 commences with the UICC which initiates the establishment of an IP connection with the target server OTA2. In practice, this is an application in the UICC which wishes to access an application or service of the target server OTA2.

For this, the UICC has in memory an address of FQDN type designating, in string form, the desired application or service, for example "ota2.OT.com".

Furthermore, the UICC may also have, in memory, an item of information on point of access APN in particular if the target server OTA2 is located in an external network PDN2, here "OT.com", or at the very least different from the PDN network defined by default in the HSS. The APN is also a string which contains a reference to the network PDN2 in which the desired application/service is available. In the example corresponding to FIG. 2, in simplified manner, the APN has the value "OT.com" or "PDN2". The exact format of the APN is indicated in the 3GPP standard TS 23 003.

The first step 200 consists for the UICC to request from the ME the establishment of an IP connection to the target server OTA2. For this, it establishes an IP local connection with the ME (see the ETSI TS 102 483 standard) and provides to it, via that local connection, the parameters necessary for the activation of a packet data service.

For example, the UICC sends a proactive OPEN CHANNEL command in accordance with the BIP protocol (ETSI TS 102 223 v11) to request from the ME the activation of a PDP context on the 3GPP mobile network 100. The OPEN CHANNEL command comprises in particular the target FQDN, the target APN (if necessary) and the IP local address of the UICC. In particular it is possible for the target APN not to be sent if it corresponds to the APN by default stored on the HSS.

The format of this OPEN CHANNEL command is provided in section 6.6.27.1 of the aforementioned standard, and comprises an item of local address data and an item of recipient address data.

To make the OPEN CHANNEL command compatible with the use of addresses of FQDN type (the standard only defines addresses of IPv4 and IPv6 type for the OPEN CHANNEL command), a code of address type currently reserved is attributed to the FQDN address type, for example the code 'F0'.

The format of the addresses for the OPEN CHANNEL command, in particular for the recipient address data having to receive the FQDN, is defined below, on the basis of its definition in the standard TS 102 223 (§8.58):

| Byte(s) | Description | Length |
|---|---|---|
| 1 | Address marker | 1 |
| 2 | Length (X) | 1 |
| 3 | Address type | 1 |
| 4 to (X + 2) | Address | X − 1 |

Address Format for the OPEN CHANNEL Command

The address type field takes the value '21' when the address provided is of IPv4 type, the value '57' when the address provided is of IPv6 type and thus the newly attributed code 'F0' when the address provided is of FQDN type. The length (X) has a value between 0 and $2^8-1$, enabling FQDNs to be provided over $2^8$ bytes, that is to say 256 ASCII characters which is generally sufficient.

In a variant embodiment, the conventional OPEN CHANNEL command is used without the above adaptation and it is the SEND DATA commands (see below) that are modified to include therein a recipient address as indicated above. To be precise, in the present embodiment of FIG. 2 as described below, the recipient address of FQDN type is only used on the mobile network 100 as from sending of data further to a SEND DATA command from the UICC. In this variant, the OPEN CHANNEL command may include only the APN (if there is one), the destination address field being left empty.

On reception of the OPEN CHANNEL request, the ME triggers a procedure for attachment to the 3GPP mobile network.

In a conventional manner, this procedure comprises the sending 202 of an "Attach Request" by the user terminal UE. This request is processed 204 by the MME that retrieves subscription information associated with the user in the HSS (including the APN by default) then performs procedures of authentication/authorization on the basis of that information before accepting 206 the attachment, "Attach Accept".

In the 3GPP packet data mobile network 100, a PDN connection is always established when the terminal UE attaches to the network.

For this, straight after the attachment procedure, the terminal UE, and more specifically the ME, sends 208 a new request "Activate PDP context Request" to the network 100. This request may possibly include an APN, the one provided in the OPEN CHANNEL command generated by the UICC or the one by default retrieved from the HSS.

This request is processed 210 in a conventional manner by the MME of the network 100. For the MME it is a matter of performing the procedures for discovery and selection as defined in that 3GPP standard TS 29 303.

These procedures are based on the DNS Resolver function of the MME through use of the APN included in the "Activate PDP context Request" or the APN by default retrieved from the HSS. They make it possible to select the PDN2 desired by the user, as well as the nodes that are internal to 100 to enable access to the PDN, i.e. in particular the appropriate gateways SGW2 and PDN-GW2.

In practice, the MME constructs a DNS request on the basis of the APN. This request makes it possible to obtain a list of internal nodes which are candidates corresponding to the access to the desired PDN. From this list, the MME selects the appropriate nodes (SGW and PDN-GW). This selection may be based on several criteria, for example on the basis of the network conditions such as the relative load between the different possible internal nodes, the geographical location of the network entities taking into account co-located nodes, or such as the topological proximity between the nodes.

All the internal nodes defining the PDP context having been selected, the MME activates the PDP context for the UE, that is to say the communication channel between the UE and the output point (PDN-GW2) to the desired PDN2, by sending 212 an "Activate PDP context Accept" to the ME.

It is to be noted that several PDP contexts may be activated by the MME for the same UE, and more particularly the same ME, that wishes to access several PDNs simultaneously.

To separately identify each of the PDP contexts, an identifier is attributed to them which is stored in memory by the MME, in association with the IP address of the ME for the MME. Indeed, these items of information will make it possible to route response messages to the ME ad hoc on the basis of the IP addresses.

On reception of the activation of the PDP context, the ME responds 214 to the OPEN CHANNEL command by a TERMINAL RESPONSE message sent to the UICC. The same message may be sent back indicating if the OPEN CHANNEL command has not been executed successfully.

Next, the UICC sends 216 the first data packets using the SEND DATA function also described in the ETSI TS 102 223 standard, via the IP local connection between the UICC and the ME.

The ME sends 218 these data packets in the activated PDP context, including therein the FQDN (obtained by the OPEN CHANNEL command and associated with the connection used between the UICC and the ME) as recipient address, and the IP address of the UE terminal as source address.

The first data packet reaches the selected gateway PDN-GW2 at step 210.

The detection of the FQDN address as recipient address by PDN-GW2 triggers 220 a procedure for DNS resolution of that FQDN address into an IP address. The PDN-GW2 gateway thus retrieves the fixed IP address of the target server OTA2, for example 64.134.242.212.

First of all, starting with the FQDN present in the received packet, the PDN-GW2 gateway checks whether it already has available in memory the IP address associated with the FQDN. This is because PDN-GW2 may store earlier DNS resolutions in a temporary memory.

If this is not the case, the PDN-GW2 gateway seeks a DNS resolution.

In an embodiment, the gateway PDN-GW2 has a DNS client on the external network PDN2 capable of accessing an external DNS server of the external network PDN2.

PDN-GW2 thus sends 222 a DNS request to the External DNS server, for the purposes of resolving the FQDN address. In response, PDN-GW2 receives 224 the resolved IP address, that is to say the fixed IP address of OTA2. PDN-GW2 stores this IP address in its temporary internal memory.

As a variant, it is possible that PDN-GW2 is not authorized, according to the parameters of the network 100, to access nodes of the external network PDN2. In this case, PDN-GW2 may access a DNS server internal to the 3GPP network 100 by requesting it to resolve the FQDN addresses on its behalf. This internal DNS server is authorized to access the external DNS server via the above messages 222 and 224.

In an embodiment, the gateway PDN-GW2 may send the resolved IP address corresponding to the FQDN back to the UE or the UICC if the latter requested it.

Once the fixed IP address of OTA2 has been obtained, PDN-GW2 sends 228 the data packet or data packets coming from UE over the external network PDN2 while beforehand having inserted the fixed IP address of OTA2 as recipient address for those packets.

In other words, PDN-GW2 substitutes 226 the recipient FQDN address by the fixed IP address obtained.

By virtue of the IP addresses and the identifiers of the PDP contexts, the messages and other response data packets sent 230 by the target server OTA2 are routed to UE then to UICC.

The embodiment of FIG. 2 thus enables the UICC to establish an IP connection with the target server OTA2, by limiting the impact of the invention to a slight adaptation of the OPEN CHANNEL command and to an adaptation of certain nodes that are internal to the 3GPP mobile network in order for them to trigger a DNS resolution on reception of an address of FQDN type sent by the UE. The UICC may thus access a service/application hosted by OTA2.

Figure 3:
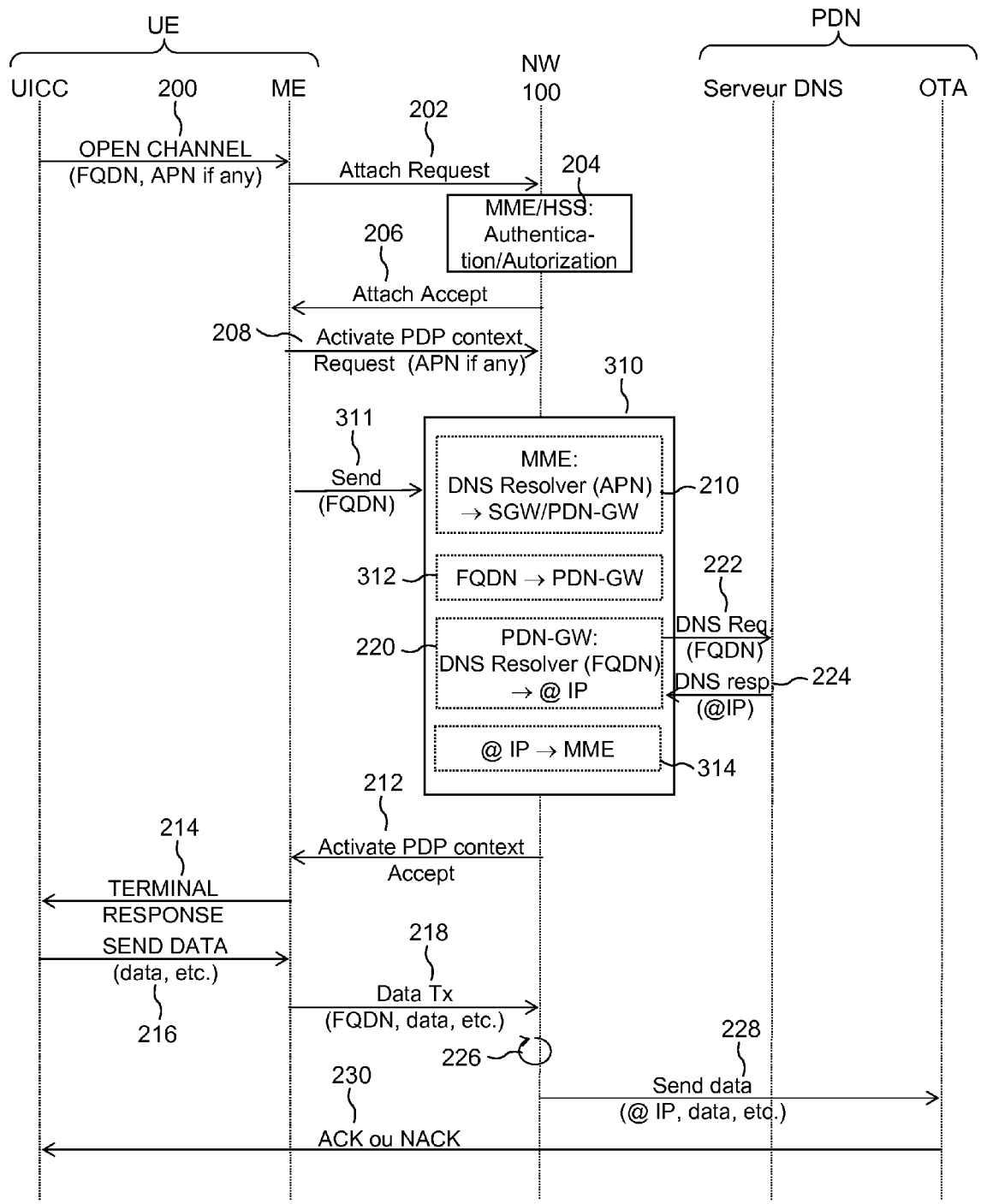
FIG. 3 illustrates exchanges of messages between various entities of FIG. 1 when establishing an IP connection between a UE and a target server OTA2 which is external to the mobile network during a procedure for activation of a PDP context.

FIG. 3 illustrates exchanges of messages between various entities of FIG. 1 when establishing an IP connection between a UE and a target server OTA2 which is external to the 3GPP mobile network during a procedure for activation of a PDP context.

This variant provides for performing the DNS resolution of the FQDN address during the procedure for activating the PDP context. The activation of the PDP context is thus only accepted when the IP address has been resolved, which makes it possible to conclude that the desired target server is accessible and available.

This variant thus avoids wasting network resources, including the activation of a PDP context for nothing in case of absence of DNS resolution.

Steps 200 to 208 are identical to those bearing the same references in FIG. 2, resulting in the request for activation of a PDP context for the UE.

The DNS resolution of the FQDN takes place when that request is processed. Thus step 310 of processing that request by the 3GPP mobile network 100 is different from step 210.

In particular, after the sending 208 of the request "Activate PDP context Request", the UE also sends 311 to the MME, in a particular message, the FQDN address of the target server as it received it from the UICC. An acknowledgement 311 of receipt by the MME may be provided the case arising.

As a variant of message 311, the FQDN address may be inserted into the request "Activate PDP context Request", for example by concatenating the APN (if there is one) with the FQDN address, possibly using delimiters enabling the MME to retrieve both items of information.

Step 310 comprises a sub-step 210 similar to step 210 of FIG. 2 consisting, for the MME, of discovering and selecting the nodes internal to 100 complying to the APN indicated in the request or the APN by default, as well as a sub-step 312 consisting for the MME of sending, by message, the received FQDN address to the selected PDN-GW gateway, a sub-step 220 similar to step 220 of FIG. 2 consisting, for the PDN-GW2, of performing a DNS resolution of the FQDN address, and a sub-step 314 consisting for the PDN-GW2 of informing the MME of the success or failure of the DNS resolution of the FQDN address into an IP address.

Sub-step 220 comprises the transmissions 222 and 224 explained above.

Sub-step 314 may also include sending the resolved IP address to the MME.

The MME accepts 212 the activation of the PDP context only after having been informed of the success of the DNS resolution.

Steps 214, 216, 218, 226, 228 and 230 are identical to those bearing the same references in FIG. 2: in particular, the PDN-GW2 is in charge of substituting 226 the FQDN address by the IP address of OTA2 in the data packets sent by the UE to OTA2.

Figure 4:
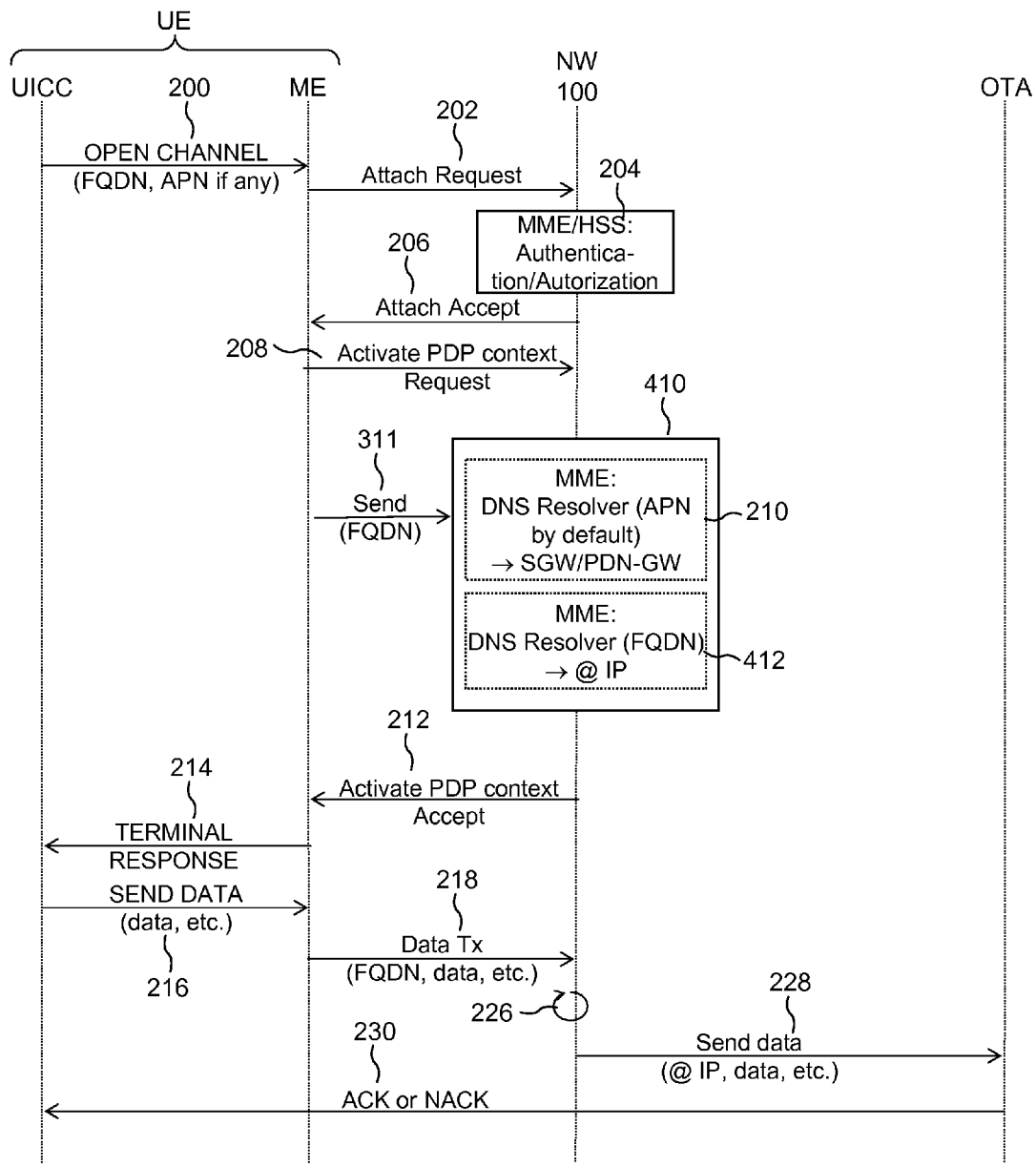
FIG. 4 illustrates exchanges of messages between various entities of FIG. 1 when establishing an IP connection between a UE and a target server OTA3 which is internal to the mobile network during a procedure for activation of a PDP context.

FIG. 4 illustrates exchanges of messages between various entities of FIG. 1 when establishing an IP connection between a UE and a target server OTA3 which is internal to the 3GPP mobile network during a procedure for activation of a PDP context.

Steps 200 to 208 are identical to those bearing the same references in FIG. 2, resulting in the request for activation of a PDP context for the UE.

However, as the desired target server OTA3 is internal to the 3GPP network 100, the UICC provides the identity of an APN corresponding to the PDN3 internal network in addition to the FQDN address or only provides an FQDN address, but no APN, in the OPEN CHANNEL command. This last situation, which is the most common in practice, relies on the fact that the APN by default stored in memory in the HSS is the one corresponding to the PDN3 internal network. The "Activate PDP context Request" thus generally includes no APN either.

In similar manner to FIG. 3, step 311 consists of the sending of the FQDN by the UE over the 3GPP mobile network (to the MME). As a variant, the FQDN may be indicated in the field for the APN within the aforementioned request, using particular delimiters enabling the MME to know whether an FQDN is concerned and not an APN.

If no APN is sent to the MME, the latter obtains the APN by default from the HSS. Otherwise it obtains the APN sent in the request.

If the APN obtained is relative to the PDN3 internal network, the MME is in charge of processing the received FQDN. According to the invention, obtaining the FQDN triggers, on the MME, the DNS resolution of that FQDN into an IP address corresponding to the target server OTA3.

Thus, step 410 of processing the request "Activate PDP context Request" and the FQDN received at step 311 comprises a sub-step 210 similar to step 210 of FIG. 2 consisting, for the MME, of discovering and selecting the nodes internal to 100 complying with the APN obtained (referencing PDN3), as well as a sub-step 412 consisting for the MME of performing a DNS resolution of the received FQDN.

Sub-step 412 of DNS resolution first of all consists, for the MME, of checking whether it already has in memory the IP address associated with the FQDN. This is because the MME may store earlier DNS resolutions in a temporary memory.

If this is not the case, the MME seeks a DNS resolution from a DNS server internal to the 3GPP mobile network (possibly implemented within the actual MME). It is thus provided that the functionalities of a DNS server internal to the 3GPP mobile network are extended to the DNS resolution for any node internal to that network and no longer uniquely to any functional node or gateway of the network architecture.

Step 412 may thus comprise the sending of a DNS request to that internal server and the reception of a DNS response comprising the IP address from the OTA3.

On reception of that address, the MME stores it in temporary internal memory.

In an embodiment, the MME may send the resolved IP address corresponding to the FQDN back to the UE or the UICC if the latter requested it.

The following steps 214, 216, 218, 226, 228 and 230 are identical to those bearing the same references in FIG. 2: in particular, the MME is in charge of substituting 226 the FQDN address by the IP address of OTA3 in the data packets sent by the UE to OTA3.

In these various embodiments of FIGS. 2, 3 and 4, an IP connection is thus established between the UE and the target OTA, in particular constituted in part in the activated PDP context in the 3GPP mobile network between the UE and the MME and in part by an IP link between that MME and the target OTA.

To enable the access by the UICC both to an internal target server OTA3 and to an external target server OTA2, the embodiment of FIG. 4 may be combined with one or other of those of FIGS. 2 and 3.

The 3GPP mobile network 100 thus comprises both an MME and one or more PDN-GW gateways configured to trigger a DNS resolution on reception of an FQDN address.

By combining FIGS. 3 and 4, the MME may comprise a logic enabling both cases to be processed:

If the "Activate PDP context Request" request does not include any APN and an FQDN address is received from the UICC/UE (step 311), then the MME itself resolves the FQDN address into an IP address (FIG. 4). This is the most common case in which the APN by default in the HSS corresponds to a network internal to the 3GPP mobile network. More generally, the resolution of the FQDN address by the MME is triggered when the latter determines that the APN for the UE in question is an APN for a network local to the mobile network 100;

Otherwise, the MME resolves only the APN obtained (discovery and selection of gateways), sends the FQDN to the selected gateway, the latter resolving the FQDN address into an IP address (FIG. 3).

The functions described above for the various entities of the 3GPP mobile network infrastructure as well as for the UE and the external PDN networks are preferably implemented in software form within corresponding hardware equipment items.

The preceding examples are only embodiments of the invention which is not limited thereto.

The invention claimed is:

1. A method of establishing an Internet Protocol connection through a mobile network, comprising the steps of:
    receiving, on a first equipment item of the mobile network, a fully qualified domain name sent by a user mobile terminal of said mobile network, the fully qualified domain name identifying a target data server, the first equipment item not being the user mobile terminal or any user mobile terminal of the mobile network;
    on reception of the fully qualified domain name, the first equipment item triggering resolution of the fully qualified domain name into an Internet Protocol address of the target data server; and
    in said first equipment item:
    receiving, from the user mobile terminal, a data packet indicating the fully qualified domain name as a recipient address for said data packet, and
    substituting the fully qualified domain name with the resolved Internet Protocol address of the target data server within the data packet before resending the data packet to the resolved Internet Protocol address.

2. The method according to claim 1, comprising the further steps of:
    the first equipment item of the mobile network obtaining, an access point name identifying an external packet data network for the user mobile terminal; and
    selecting, by another equipment item of the mobile network other than the user mobile terminal, at least one gateway of the mobile network to the external packet data network, by a procedure of discovery and selection from the obtained access point name,
    wherein the first equipment item is said selected at least one gateway.

3. The method according to claim 2, wherein the mobile network is a 3GPP mobile network at least partially of Internet Protocol type, the first equipment item is a packet data network gateway of the 3GPP mobile network to the external packet data network, the other equipment item is a mobility management entity of the 3GPP mobile network, and the target data server is a node that is external to the 3GPP mobile network belonging to the external packet data network.

4. The method according to claim 2, wherein, to resolve the fully qualified domain name into the Internet Protocol address, the first equipment item forming the selected at least one gateway to the external packet data network sends a domain name system resolution request to an external domain name system server belonging to the external packet data network.

5. The method according to claim 1, wherein the mobile network is a 3GPP mobile network at least partially of Internet Protocol type, the first equipment item is a first mobility management entity of the 3GPP mobile network and the target data server is a node that is internal to the 3GPP mobile network.

6. The method according to claim 5, wherein the triggering of the resolution of the fully qualified domain name takes place when the first mobility management entity equipment item has not already obtained an access point name identifying an external packet data network for the user mobile terminal;
    and when the access point name has already been obtained, the first mobility management entity equipment item sends the fully qualified domain name to a gateway, internal to the 3GPP mobile network, to the external packet data network.

7. The method according to claim 1, wherein the resolution of the fully qualified domain name into the Internet Protocol address is carried out during a procedure for activation, in the mobile network, of a context of packet data protocol between the user mobile terminal and a target node of the mobile network.

8. The method according to claim 1, wherein the resolution of the fully qualified domain name into the Internet Protocol address is carried out subsequently to a procedure for activation, in the mobile network, of a context of packet data protocol between the user mobile terminal and a target node of the mobile network, in response to the sending, by the user mobile terminal, of the data packet bearing the fully qualified domain name as the recipient address.

9. The method according to claim 1, wherein, before sending the fully qualified domain name to the first equipment item, the user mobile terminal receives a request comprising the fully qualified domain name and sent by a secure module inserted into the user mobile terminal.

10. The method according to claim 9, wherein the secure module is a universal integrated circuit card and the request is an OPEN CHANNEL request defined in accordance with standard ETSI TS 102 223.

11. The method according to claim 10, wherein the OPEN CHANNEL request comprises at least one address data item and a byte of address type in said at least one address data item which takes a particular value other than '21' and '57' when an address provided in a field of said at least one address data item is the fully qualified domain name.

12. The method according to claim 1, wherein the first equipment item sends the resolved Internet Protocol address of the target data server to the user mobile terminal.

13. A mobile network equipment item of a mobile network, comprising:
   a gateway configured for receiving a fully qualified domain name, sent by a user mobile terminal of the mobile network, the fully qualified domain name identifying a target data server; and
   the gateway, on reception of the fully qualified domain name, triggering resolution of the fully qualified domain name into an Internet Protocol address of the target data server,
   wherein the gateway is further configured to perform the steps of:
   receiving, from the user mobile terminal, a data packet indicating the fully qualified domain name as a recipient address for said data packet, and
   substituting the fully qualified domain name by the resolved Internet Protocol address of the target data server within the data packet before resending the data packet to the resolved Internet Protocol address.

14. The mobile network equipment item according to claim 13, wherein the gateway is a packet data network gateway of a 3GPP mobile network to an external packet data network, the target data server identified by the fully qualified domain name being a node external to the 3GPP mobile network belonging to the external packet data network.

15. The mobile network equipment item according to claim 14, wherein the gateway is configured to resolve the fully qualified domain name into the Internet Protocol address by sending a domain name system resolution request to an external domain name system server belonging to the external packet data network.

16. The mobile network equipment item according to claim 13, wherein the gateway is a mobility management entity of a 3GPP mobile network, the target data server identified by the fully qualified domain name being a node external to the 3GPP mobile network.

17. The mobile network equipment item according to claim 16, wherein the gateway is configured for triggering the resolution of the fully qualified domain name when the mobility management entity equipment item has not already obtained an access point name, identifying an external packet data network for the user mobile terminal; and when the access point name has already been obtained, for sending the fully qualified domain name to a gateway, internal to the 3GPP mobile network, to the external packet data network.

18. The mobile network equipment item according to claim 13, wherein the gateway is configured to resolve the fully qualified domain name into the Internet Protocol address during an activation procedure, in the mobile network, of a context for packet data protocol between the user mobile terminal and a target node of the mobile network.

19. The mobile network equipment item according to claim 13, wherein the gateway is configured for resolving the fully qualified domain name into the Internet Protocol address subsequently to a procedure for activation, in the mobile network, of a context of packet data protocol between the user mobile terminal and a target node of the mobile network, in response to the sending, by the user mobile terminal, of a data packet bearing the fully qualified domain name as the recipient address.

20. A mobile network infrastructure, comprising the mobile network equipment item of claim 13, comprising:
   a mobility management entity of a 3GPP mobile network obtaining an access point name identifying an external packet data network for the user mobile terminal of the mobile network; and selecting the gateway of the mobile network to the external packet data network, by a procedure of discovery and selection from the obtained access point name.

* * * * *